(12) United States Patent
Geyer et al.

(10) Patent No.: US 10,830,182 B2
(45) Date of Patent: Nov. 10, 2020

(54) COMBUSTION CHAMBER STRUCTURE, PARTICULARLY FOR A ROCKET ENGINE

(71) Applicant: ArianeGroup GmbH, Taufkirchen (DE)

(72) Inventors: Marc Geyer, Munich (DE); Andreas Goetz, Vaterstetten (DE); Torben Birck, Munich (DE)

(73) Assignee: ARIANEGROUP GMBH, Taufkirchen (DE)

( * ) Notice: Subject to any disclaimer, the term of this patent is extended or adjusted under 35 U.S.C. 154(b) by 107 days.

(21) Appl. No.: 15/677,176

(22) Filed: Aug. 15, 2017

(65) Prior Publication Data
US 2018/0051656 A1    Feb. 22, 2018

(30) Foreign Application Priority Data
Aug. 16, 2016   (DE) .................. 10 2016 215 244

(51) Int. Cl.
*F02K 9/64* (2006.01)
*F02K 9/97* (2006.01)

(52) U.S. Cl.
CPC ............... *F02K 9/64* (2013.01); *F02K 9/972* (2013.01); *F05D 2250/312* (2013.01); *F05D 2260/205* (2013.01); *F05D 2260/31* (2013.01)

(58) Field of Classification Search
None
See application file for complete search history.

(56) References Cited

U.S. PATENT DOCUMENTS

| 2,705,399 A | 4/1955 | Allen |
| 3,595,025 A * | 7/1971 | Stockel ................. B23P 15/008 165/169 |
| 4,811,556 A | 3/1989 | Lau et al. |
| (Continued) | | |

FOREIGN PATENT DOCUMENTS

| DE | 3734103 | 4/1988 |
| DE | 19927735 | 12/2000 |
| (Continued) | | |

OTHER PUBLICATIONS

Haidn, Oskar J., Advanced Rocket Engines, 2008, Advances on Propulsion Technology for High-Speed Aircraft (pp. 6-1-6-40). Educational Notes RTO-EN-AVT-150, Paper 6. Neuilly-sur-Seine, France: RTO (Year: 2008).*

(Continued)

*Primary Examiner* — Craig Kim
*Assistant Examiner* — Alyson Joan Harrington
(74) *Attorney, Agent, or Firm* — Greer, Burns & Crain, Ltd.

(57) ABSTRACT

A combustion chamber structure, particularly for a rocket engine, which comprises a liner surrounding a combustion chamber with an outer surface facing away from the combustion chamber on which coolant channels extending in a longitudinal direction of the liner are formed. The liner forms, at one longitudinal end, a coolant chamber extending in the circumferential direction of the liner for collecting and/or distributing a coolant. The combustion chamber structure further comprises a connecting structure that fluidly connects the coolant chamber to the coolant channels.

17 Claims, 4 Drawing Sheets

(56) References Cited

U.S. PATENT DOCUMENTS

| | | | | |
|---|---|---|---|---|
| 5,473,817 | A * | 12/1995 | Schnoor | B23P 15/008 29/890.01 |
| 5,557,928 | A * | 9/1996 | Castro | F02K 9/64 60/260 |
| 6,134,782 | A * | 10/2000 | Wright | B23P 15/008 29/527.2 |
| 6,698,184 | B1 | 3/2004 | Sowa | |
| 7,347,041 | B1 * | 3/2008 | McMullen | F02K 9/64 239/127.1 |
| 8,413,419 | B2 * | 4/2013 | Mungas | F02K 9/34 60/206 |
| 2004/0148924 | A1 * | 8/2004 | Beyer | B23P 15/008 60/257 |
| 2004/0250530 | A1 * | 12/2004 | McMullen | F02K 9/64 60/257 |
| 2005/0178106 | A1 | 8/2005 | Clark et al. | |
| 2009/0235636 | A1 | 9/2009 | Oehrlein | |
| 2009/0293448 | A1 * | 12/2009 | Grote | F02K 9/64 60/204 |
| 2010/0205933 | A1 * | 8/2010 | Mungas | F02K 9/34 60/267 |
| 2013/0219901 | A1 * | 8/2013 | Indersie | F02K 9/34 60/770 |

FOREIGN PATENT DOCUMENTS

| | | |
|---|---|---|
| DE | 10237381 | 2/2004 |
| FR | 2962493 | 1/2012 |

OTHER PUBLICATIONS

German Search Report, dated Mar. 28, 2017, priority document.

* cited by examiner

COMBUSTION CHAMBER STRUCTURE, PARTICULARLY FOR A ROCKET ENGINE

CROSS-REFERENCES TO RELATED APPLICATIONS

This application claims the benefit of the German patent application No. 10 2016 215 244.0 filed on Aug. 16, 2016, the entire disclosures of which are incorporated herein by way of reference.

BACKGROUND OF THE INVENTION

The disclosure relates to a combustion chamber structure, particularly for a rocket engine, and comprises a liner that surrounds a combustion chamber and has an outer surface facing away from the combustion chamber, with coolant channels extending in the longitudinal direction of the liner being formed on the outer surface, and a coolant chamber for collecting and/or distributing a coolant. In principle, the combustion chamber structure can be employed not only in the special area of rocket engines, but for other areas as well, such as aircraft construction.

In a combustion chamber structure of a rocket engine, the continuously occurring combustion process results in very high temperatures, typically of over 3000° C., and very high pressures, typically of greater than 150 bar. Therefore, a combustion chamber structure must be designed so as to withstand these high temperatures and pressures.

Usually, combustion chamber structures have a highly thermoconductive inner jacket ("liner") for this purpose that has a plurality of coolant channels on its outer side, and an outer jacket ("jacket") that seals off the coolant channels and bears the majority of the mechanical forces acting on the combustion chamber structure during operation. The coolant may be a cryogenic fuel which, after emerging from the cooling channels, is fed to the combustion chamber for combustion. The jacket is typically made of nickel and applied galvanically. Manifolds, which distribute the coolant to the coolant channels and collect it again from the coolant channels, are welded onto the jacket. To enable the manifolds to be welded on, the jacket has connecting structures that are suitably designed for the manifolds.

Since it is the jacket that primarily bears the mechanical loads in the described combustion chamber structure and, what is more, the jacket must provide the interface geometry for the manifolds, the jacket must be formed by a continuously thick layer that has locally even greater thicknesses. This results in long bath times during galvanizing, and hence to high manufacturing costs.

Added to this is the fact that, in order for the manifolds to be welded to the jacket, the jacket must be made of a material that can be welded and applied galvanically. Such materials often have very low strength, which must be compensated for by increasing the thickness of the jacket.

A combustion chamber structure is known from DE 102 37 381 A1 in which at least one manifold (distributor) for supplying and discharging a coolant is soldered to the combustion chamber liner and the region of the combustion chamber liner that is not covered by the manifold or manifolds is coated with a galvanically applied supporting jacket.

SUMMARY OF THE INVENTION

A combustion chamber structure is to be provided which satisfies the requirements for temperature resistance and mechanical resilience while being inexpensive to manufacture.

The disclosed combustion chamber structure comprises a liner that surrounds a combustion chamber and has an outer surface facing away from the combustion chamber, with coolant channels extending in the longitudinal direction of the liner being formed on the outer surface, and with the liner, at a longitudinal end, forming a coolant chamber for collecting and/or distributing a coolant that extends in the circumferential direction of the liner. The combustion chamber structure further comprises a connecting structure that fluidly connects the coolant chamber to the coolant channels.

The liner is made of a thermoconductive material. Furthermore, the material of the liner should also be compatible with the fuels used and have sufficient strength. The liner may be made of a steel or of a copper alloy, for example. The raw part of the liner may be a forged body whose outer contour is turned. The coolant channels formed on the outer surface of the liner may be created through mechanical processing, for example by milling the liner material. The reaction heat given off to the liner during the combustion process can be absorbed by the coolant conducted in the coolant channels and carried away from the combustion chamber structure. The coolant used may be a cryogenic fuel that is heated in this way and can be subsequently fed to the combustion chamber. The coolant chamber has the purpose of dividing up the coolant among the individual coolant channels and/or collecting the heated coolant from the coolant channels and redirecting it. The fluid connection between the coolant channels and the coolant chamber is provided in a simple manner by the connecting structure. The coolant chamber, which may act as a manifold, is formed by the liner itself, which also surrounds the combustion chamber. It is therefore not necessary to provide one or more interface geometries on one of the jackets in order to connect the manifold(s), nor is it necessary to connect one or more separate manifolds to a jacket of the combustion chamber structure. This results in lower costs.

Furthermore, this results in greater stability on the part of the liner in comparison to a liner on which a coolant chamber is mounted, since transitions at weld seams, for example, generally have less strength than the base material itself or the base materials themselves. In contrast, in the disclosed embodiment, in which the coolant chamber is formed at a longitudinal end of the liner by the liner itself, meaning that the liner widens at its longitudinal end, forces acting on the liner are redirected directly via the liner without having the forces flow over a transition such as a weld seam.

In one development, the connecting structure is formed by openings extending in the liner in the longitudinal direction of the liner into which a respective coolant channel leads at one end and which lead at their other end to the coolant chamber.

The openings can be made through drilling, milling, or erosion, for example. Unlike the coolant channels, the openings are defined over their entire periphery by the liner material, which means that they are circumferentially closed and capable of conducting the coolant. They are embodied such that they fluidly connect the coolant channels to the coolant chamber. The openings can extend the coolant channels in the longitudinal direction of the liner toward the coolant chamber. The described openings represent a simple possibility for a connecting structure. By virtue of their special design and arrangement, the coolant chamber may be arranged in the immediate vicinity of the coolant channels.

In another development, the combustion chamber structure further comprises a jacket that surrounds the liner at least partially such that the coolant channels are covered and fluidly isolated from one another. For example, the jacket may be formed by welded-on metal sheets, through application of a covering material by means of cold gas spraying, or through the galvanic application of a layer made of nickel, for example.

The jacket thus serves to guide the coolant into the cooling channels and absorb compressive loads from the coolant pressure. At least a portion of the coolant chamber formed by the liner may be a region that is not covered by the jacket. The jacket can thus surround the liner such that the liner is not completely covered. As a result, the weight of the combustion chamber structure can be reduced. Moreover, jacket material and, if the jacket is applied, processing time can be saved, which results in a reduction in cost. Since, as described above, the liner has a great stability compared to a liner on which the manifold or manifolds are mounted from the outside, the jacket can have a thinner design in the other development than in connection with a liner with manifolds mounted from the outside. Since the jacket also need not have any boundary surface geometries for one or more manifolds, the jacket may be configured thinner throughout.

In one embodiment, the coolant chamber may be delimited by a first wall that is connected in a fluid-tight manner to the liner. For example, it may be connected to the liner by means of a welded connection or a screw connection. In order to fluidly seal the coolant chamber, the coolant chamber therefore has a first wall that is not formed by the liner. The first wall may be made of the same material as the liner, for example of steel. The welding process can thus be simplified in comparison to a steel-nickel or copper-nickel welded connection. In addition, the weld seam can also be provided by means of tungsten inert gas welding (TIG welding), which is more cost-effective than electron beam welding. The first wall may also be part of an adjacent component, such as the flange of a radiative nozzle. The fluid-tight connection may then be achieved in conjunction with seals, for example.

In this embodiment, the coolant chamber can be delimited by several walls, with the several walls that are not the first wall each being formed by the liner. All of the walls delimiting the coolant chamber are thus formed by the liner; only the first wall is subsequently attached to the liner. If welding is used, only two weld seams are thus produced in order to create the coolant chamber, which means that there are only two weld seams that have to be qualified. This enables production and development costs to be reduced in comparison to other combustion chamber structures, in which the number of weld seams is greater.

In one especially simple embodiment, one of the several walls that are not the first wall is formed by a portion of an inner wall of the liner, and the coolant chamber extends radially outward, that is, away from the interior of the liner.

In another embodiment, the coolant chamber can be formed by a groove that runs in the liner in the circumferential direction thereof. The coolant chamber formed by the groove may have a smaller volume than the above-described coolant chamber that is defined by the first wall. In this embodiment as well, the forces acting on the liner can be redirected directly via the liner.

The design according to another embodiment is especially advantageous in conjunction with an injection head for introducing a fuel into the combustion chamber, with the coolant chamber then being in fluid communication with the injection head. The coolant is thus conveyed via the coolant chamber for combustion in the combustion chamber. The coolant chamber may then be designed with a relatively small volume, since the entire mass flow of the coolant does not have to be bundled into a pipe.

In another development, the liner is embodied as a one-piece part. Furthermore, the coolant chamber may be formed through the removal of the material of the liner. In that case, a previously massive region of the liner may be worked in a targeted manner such that a coolant chamber extending in the circumferential direction of the liner is created at a longitudinal end of the liner. Insofar as the liner is still open on one side, it may be sealed subsequently through the attachment of a wall that is distinct from the liner, so that the first wall need only be connected to the liner in order to provide the combustion chamber structure.

In another development, the liner is embodied such that it bears the majority of the forces acting on the combustion chamber structure. This is achieved, for one, by having the coolant chamber be formed by the liner itself, as described above, so that the forces acting on the liner can be redirected directly instead of via a transition such as a weld seam. In addition, the necessary stability of the liner may be achieved through other measures, such as through the material used for the liner. For instance, the liner may be made of a steel. The jacket need then only bear the compressive loads from the coolant pressure and can therefore have a relatively thin design. This results in reduced cost due to the material saved. In the case of a galvanically applied jacket, it may also be manufactured with relatively short bath times, which additionally reduces costs. Steel has the additional advantage of being an economical material.

The liner may also have a first portion that defines the combustion chamber and a second portion adjacent to the first portion that forms at least a portion of an expansion nozzle, wherein the coolant chamber may be formed on the second portion. The liner then surrounds two regions having different functions, both of which are cooled by the coolant flowing in the coolant channels. The first region with the combustion chamber typically has a cylindrical region having a constant diameter and a transitional portion to the second region, in which the diameter of the cylinder decreases gradually—the so-called nozzle throat. The second region with the expansion nozzle is usually approximately frustoconical and has a diameter that increases starting from the first region. The region with the smallest diameter is the nozzle throat. The expansion nozzle with the nozzle throat has the dual function of increasing the internal pressure during the combustion process and accelerating the released combustion products from the combustion chamber.

Furthermore, the coolant chamber may have an attachment structure on an outer peripheral edge. This can be used to fasten the combustion chamber structure to an expansion nozzle of a rocket engine, for example. The structure of the liner that provides the coolant chamber thus also has the function of providing an attachment means. Just like the coolant chamber, this attachment structure may be integrally formed with the liner and may be formed particularly through the removal of the material of the liner. An additional separate attachment structure is therefore not required.

In one embodiment, the combustion chamber structure has a first coolant chamber that is formed on a longitudinal end of the liner and a second coolant chamber that is formed on the opposing longitudinal end of the liner. The first and second coolant chambers may have different designs according to the two embodiments described above.

BRIEF DESCRIPTION OF THE DRAWINGS

Additional advantages, details, and features of the solution described herein will be apparent from the following description of an exemplary embodiment and from the figures.

DETAILED DESCRIPTION OF THE PREFERRED EMBODIMENTS

Figure 1:
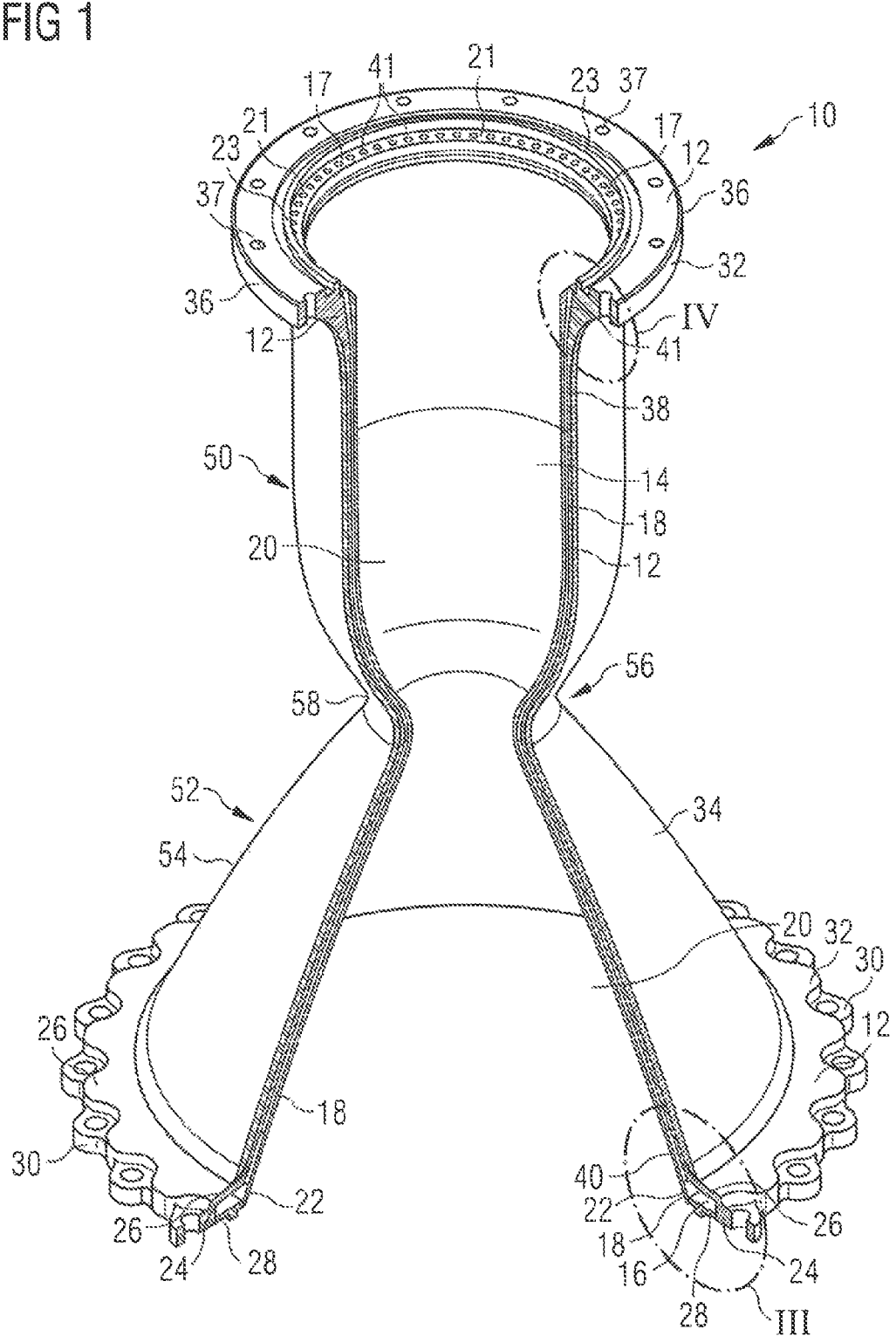
FIG. 1 shows a perspective view of an exemplary embodiment of a combustion chamber structure with liner and jacket.

The combustion chamber structure 10 shown in FIG. 1 has a liner 12 that surrounds a combustion chamber 14. At its lower longitudinal end with respect to FIG. 1, the liner 12 forms a coolant chamber 16. The coolant chamber 16 extends in the circumferential direction of the liner 12 and outward in the radial direction of the liner 12. In particular, the liner 12 has an inner wall 18 that delimits an interior space 20 of the combustion chamber structure 10 and forms at its lower end with respect to FIG. 1 an inwardly disposed side wall 22 of the coolant chamber 16. Furthermore, the coolant chamber 16 is defined toward the outside in the radial direction by another outer side wall 24 opposite to the inwardly disposed side wall 22 and upward with respect to FIG. 1 by an upper wall 26. The two side walls 22, 24 and the upper wall 26 are formed by the liner 12. In the exemplary embodiment depicted here, the liner 12 is embodied as a one-piece part.

Toward the bottom with respect to FIG. 1, the coolant chamber 16 is delimited by a lower wall 28 or first wall 28, which also extends in the circumferential direction of the liner 12. The lower wall 28 is connected to the liner 12. In particular, the lower wall 28 is connected to the two side walls 22, 24 of the coolant chamber 16, thus providing a fluid-tight coolant chamber 16. In the exemplary embodiment depicted here, the lower wall 28 is connected to the liner 12 by means of welding.

The upper wall 26 and the lower wall 28 of the coolant chamber 16 project outward in the radial direction. In the exemplary embodiment depicted here, the upper wall 26 and the lower wall 28 do not run exactly parallel to one another; rather, the upper wall 26 has a slight inclination with respect to the lower wall 28. In another embodiment, however, they can also run substantially parallel to one another.

On its outer surface facing away from the coolant chamber 16, the outer side wall 24 has an attachment structure 30 by means of which the combustion chamber structure 10 can be attached to an adjacent component.

Furthermore, the liner 12 forms an additional coolant chamber 17 at an upper longitudinal end with respect to FIG. 1 that extends in the circumferential direction of the liner 12. In particular, the inner wall 18 of the liner 12 is thicker at its upper end with respect to FIG. 1 than in the remaining regions of the liner 12. The thicker inner wall 18 at the one longitudinal end also forms an attachment flange 36 here at which the combustion chamber structure 10 can be attached to an adjacent component. Attachment holes 37 are provided in the attachment flange 36 for this purpose. Together, the attachment flange 36 and attachment holes 37 form an attachment structure.

An annular groove is formed in the liner 12 at the thicker longitudinal end that is immediately adjacent to the interior space 20 of the liner 12. The annular groove 21 forms the additional coolant chamber 17. The additional coolant chamber 17 is delimited laterally only in one direction by a wall 23 formed by the liner 12. In particular, the additional coolant chamber 17 is not delimited by a wall laterally inward in the radial direction, that is, toward the interior space 20, and is delimited by the wall 23 laterally outward in the radial direction.

A jacket 34 is arranged on an outer surface 32 of the liner 12 facing away from the interior space 20. The jacket 34 is arranged so as to be coaxial with the liner 12. The jacket 34 covers the majority of the outer surface 32 of the liner 12. In the exemplary embodiment depicted here, the jacket 34 does not cover the outer surface 32 of the liner 12 at the upper longitudinal end of the liner with respect to FIG. 1 at which the attachment flange 36 is formed. Furthermore, the jacket 34 does not cover the outer surfaces 32 of the liner 12 that delimit the coolant chamber 16.

Figure 2:
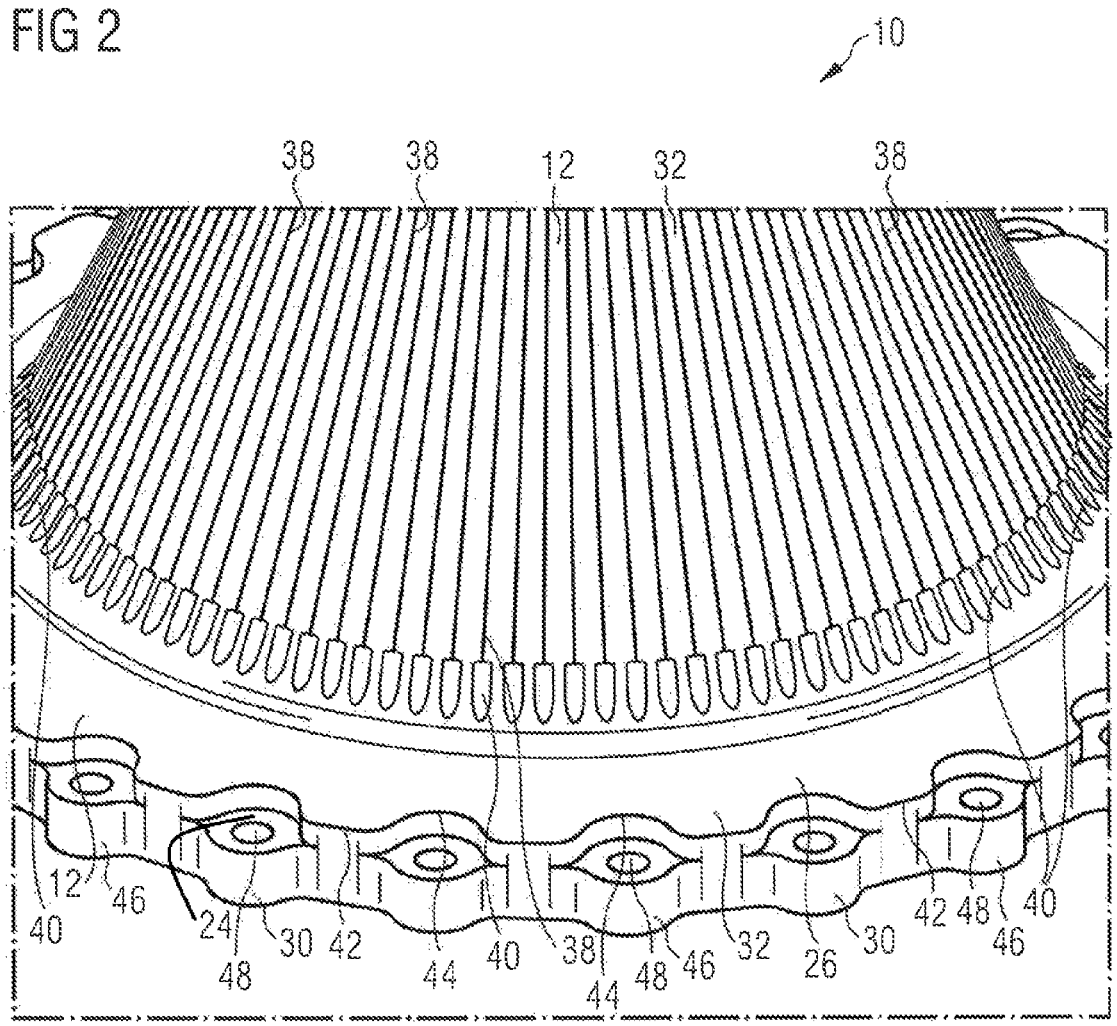
FIG. 2 shows a partial view of the combustion chamber structure shown in FIG. 1 without jacket.

In FIG. 2, the lower region of the combustion chamber structure 10 with respect to FIG. 1 is enlarged, and the combustion chamber structure 10 is shown without the jacket 34 arranged over the liner 12. As can be seen in this illustration without jacket 34, the liner 12 has a plurality of coolant channels 38 on its outer surface 32. The plurality of coolant channels 38 run from bottom to top with respect to FIGS. 1 and 2, that is, in the longitudinal direction of the liner 12. The coolant channels 38 can be formed through mechanical working such as through the milling of the liner 12. As can also be seen in FIG. 2, each coolant channel 38 is adjacent at its lower end with respect to FIG. 2 to an opening 40 formed in the liner 12 or protrudes into same. The plurality of openings 40 form a connecting structure. Each of the openings 40 also extends in the longitudinal direction of the liner 12, particularly such that each of the openings 40 leads into the coolant chamber 16 at its end opposite the coolant channel 38. The configuration of the openings 40 will be explained more precisely in the description of FIG. 3.

As can be seen in FIG. 1, each coolant channel 38 is adjacent at its upper end with respect to FIG. 1 to an additional opening 41 formed in the liner or protrudes into the liner. The plurality of additional openings 41 also form a connecting structure. Each of the additional openings 41 also extends in the longitudinal direction of the liner 12, particularly such that each of the additional openings 41 leads into the additional coolant chamber 17 at its end opposite the coolant channel 38. The plurality of additional openings 41 are formed in the inner wall 18, particularly in the inner wall 18 at the longitudinal end of the liner 12 at which the inner wall 18 is thicker than in the remaining region of the liner 12.

The coolant channels 38 extend from below with respect to FIG. 1 beginning at the openings 40 over the outer surface 32 and end with the beginning of the additional openings 41 at the upper longitudinal end of the liner 12 with respect to FIG. 1. As can be seen in FIG. 1, the jacket 34 completely covers the plurality of coolant channels 38 as well as the portion of each opening 40 and of each additional opening 41 that is formed on the outer surface 32 of the liner 12. The jacket 34 seals the coolant channels 38 so that they are fluidly isolated from one another.

The attachment structure 30 adjacent to the coolant chamber 16 can also be seen clearly in FIG. 2. The attachment structure 30 is embodied in the outer side wall 24 and has an undulated contour 42. In the wave troughs 44 of the undulated contour 42, the outer side wall 24 forms a plurality of attachment elements 46 with attachment holes 48 that surround the combustion chamber structure 10 in the circumferential direction. The attachment elements 46 in the wave troughs 44 also form a wavelike pattern. The attachment holes 48 surround the combustion chamber structure 10 in the circumferential direction and are regularly spaced apart.

The combustion chamber structure 10 shown in FIG. 1 has an upper, first portion 50 with respect to FIG. 1 that comprises the combustion chamber 14 and, adjacent thereto, a lower, second portion 52 with respect to FIG. 1 that comprises a nozzle expansion 54 of an expansion nozzle. A smaller-diameter intermediate portion 56 comprising a nozzle throat 58 is formed between the first portion 50 with the combustion chamber 14 and the second portion 52 with the nozzle expansion 54. In particular, the second portion 52 can comprise a portion of a nozzle expansion 54 of an expansion nozzle, and the attachment structure 30 can be used to connect the portion of the nozzle expansion 54 of the expansion nozzle to an extension part of the nozzle expansion of the expansion nozzle.

Figure 3:
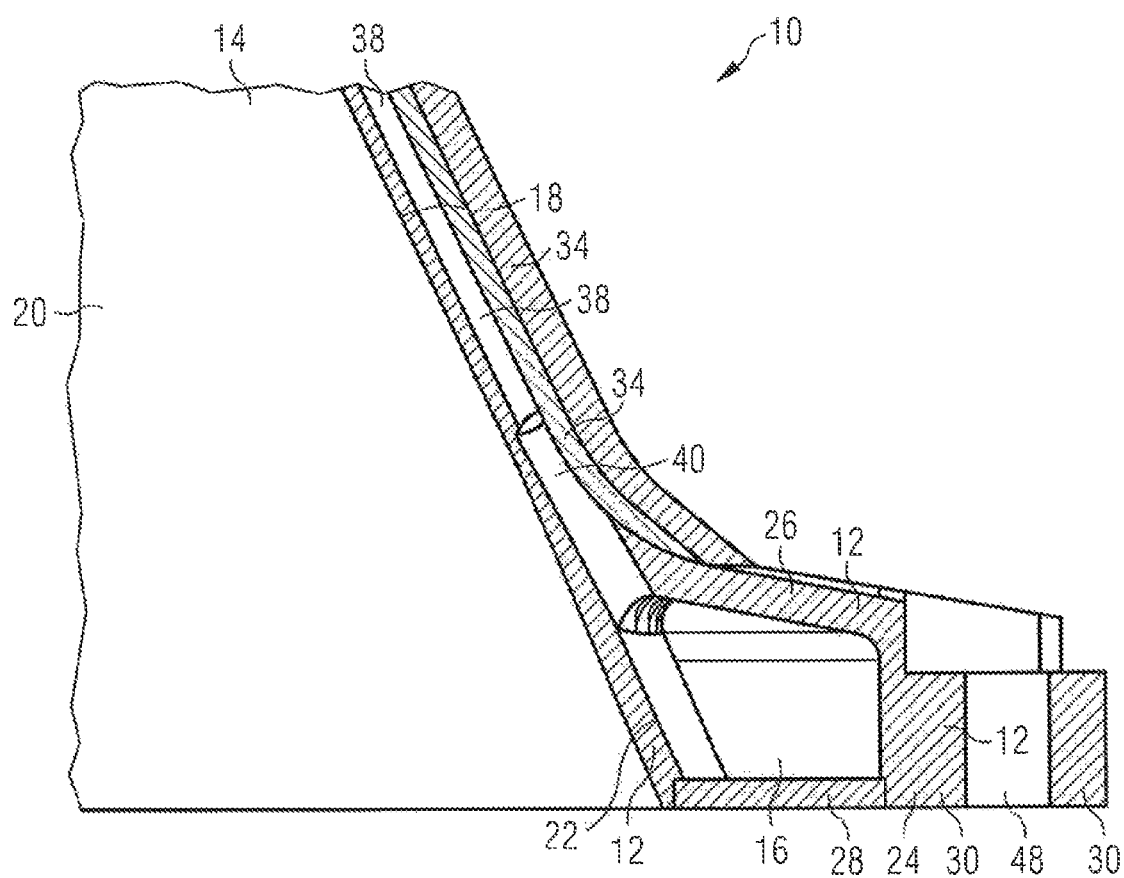
FIG. 3 shows a sectional view of the region of the combustion chamber structure designated in FIG. 1 by III.

In FIG. 3, the cut-out designated in FIG. 1 by III is shown in an enlarged cross section. FIG. 3 shows, among other things, the liner 12 with the inner wall 18, the jacket 34, the coolant chamber 16, the lower wall 28, which forms a cover for the coolant chamber 16, and the attachment structure 30. As can be seen clearly in this figure, an opening 40 embodied in the surface material of the liner 12 is adjacent to a coolant channel 38, is closed in the circumferential direction, and extends the coolant channel 38 downward into the coolant chamber 16 with respect to FIG. 3. The openings 40 are formed in the inner wall 18 of the liner 12 in the longitudinal direction of the liner 12. In the coolant chamber 16, the openings 40 laterally lead out of the inner wall 18, so that the coolant can travel from the coolant chamber 16 into the opening 40 or, conversely, from the opening 40 into the coolant chamber 16. An opening 40 thus forms a respective through hole between the coolant chamber 16 and one of the coolant channels 38.

It can also be seen in FIG. 3 that the jacket 34 covers the coolant channels 38 and the portion of the liner 12 in which the openings 40 are formed and that forms an outer wall. The jacket 34 also covers a small portion of the upper wall 26, which delimits the coolant chamber 16.

Figure 4:
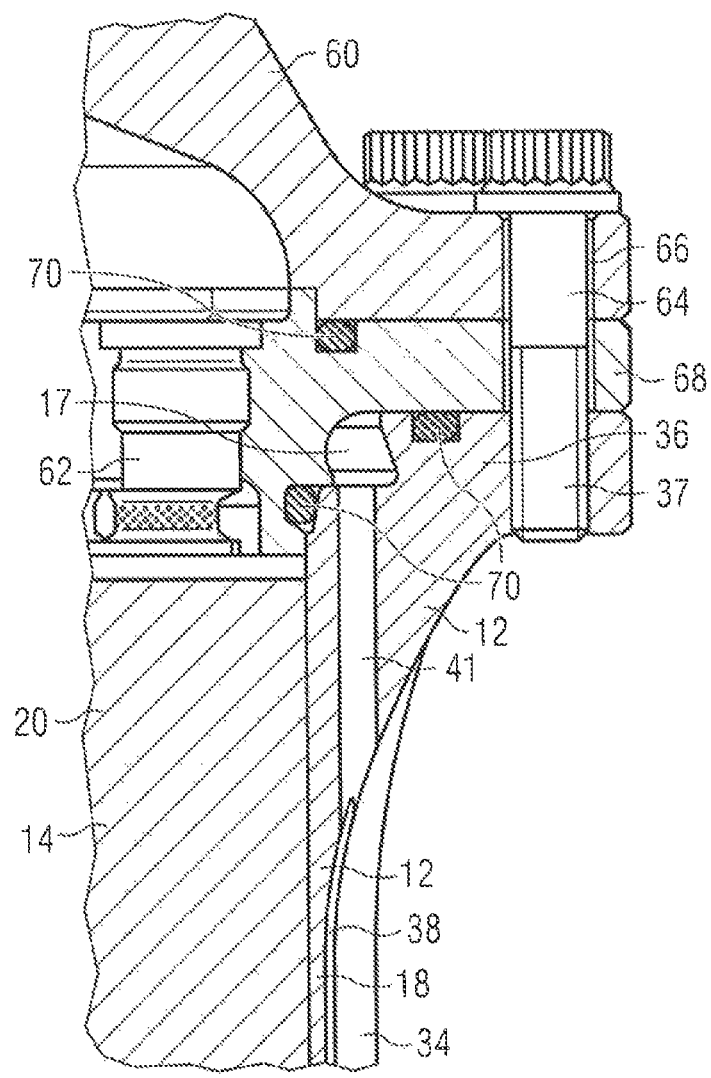
FIG. 4 shows a sectional view of the region of the combustion chamber structure designated in FIG. 1 by IV, with the state being shown in which the combustion chamber structure is attached to an adjacent component.

In FIG. 4, the cut-out designated in FIG. 1 by IV is shown in an enlarged cross section, particularly in a state in which the combustion chamber structure 10 is attached at this longitudinal end to an adjacent component. FIG. 4 also shows, among other things, the liner 12 with the inner wall 18, the jacket 34, the additional coolant chamber 17, and the attachment flange 36. As can be seen clearly in this figure, an additional opening 41 embodied in the liner 12 is adjacent to a coolant channel 38, is closed in the circumferential direction, and extends the coolant channel 38 upward with respect to FIG. 4 into the coolant channel 17. The additional openings 41 are formed in the inner wall 18 of the liner 12 in the longitudinal direction of the liner 12 and open into the additional coolant chamber 17. In this way, the coolant can travel from the additional coolant chamber 17 into the additional opening 41 or, conversely, from the additional opening 41 into the additional coolant chamber 17. An additional opening 41 thus forms a respective through hole between the additional coolant chamber 17 and one of the coolant channels 38.

FIG. 4 also shows an injection head 62 by means of which the fuel can be introduced into the combustion chamber 14. In the exemplary embodiment shown here, the coolant is conveyed out of the additional coolant chamber 17 further into the injection head 62 and, from there, conveyed into the combustion chamber 14. In the exemplary embodiment shown here, the additional coolant chamber 17 thus functions both as a collection chamber and as a distribution chamber. It therefore has a smaller volume than the coolant chamber 16, which functions as a distribution chamber.

It can also be seen in FIG. 4 that the combustion chamber structure 10 is attached by means of an attachment means 64 to the adjacent component 60. The attachment means 64 is passed through an attachment hole 37 formed in the liner 12 and through an attachment hole 66 of the adjacent component 60 that is flush therewith. An insert 68 into which the injection head 62 is integrated is located between the combustion chamber structure 10 and the adjacent component 60. The insert 68 delimits the additional coolant chamber 17 in a lateral direction, particularly inwardly in the direction of the interior space 20 of the liner 12, and upward with respect to FIG. 4, that is, toward a side that is opposite to the additional openings 41. The combustion chamber 14 and the additional coolant chamber 17 are sealed in a fluid-tight manner by means of seals 70 against the external environment of the combustion chamber structure 10.

As can be seen in FIG. 1, the attachment flange 36 has a plurality of attachment holes 37 in the circumferential direction of the attachment flange 36 through each of which an attachment means 64 can be passed.

The openings 40 and the additional openings 41 can be formed by drilling or erosion, for example.

The liner 12 is made of a thermoconductive material. In the exemplary embodiment shown here, the liner 12 is made of a steel. The liner 12 can bear the majority of the forces that act on the combustion chamber structure 10 during operation. The liner 12 is particularly made of a one-piece part. The region of the liner 12 that forms the coolant chamber 16 may be embodied so as to be massive after a suitable shaping process and may be subsequently worked using a suitable material-removing process such that the coolant chamber 16 and the attachment structure 30 are created. The coolant chamber 16 can then be sealed by welding the lower wall 28 to the liner 12, for example. In the exemplary embodiment shown here, the lower wall 28 is also made of steel.

In the exemplary embodiment shown here, the jacket 34 is applied galvanically to the liner 12 and is therefore made of a material that can be applied galvanically. In the exemplary embodiment shown here, the jacket 34 is made of nickel. The jacket 34 is applied to the liner 12 in such a way that it seals off the coolant channels 38 from one another and thus guides the coolant in the coolant channels 38. Furthermore, the jacket 34 serves to absorb compressive loads from the coolant pressure. Unlike in known combustion chamber structures, however, it is no longer used to bear the majority of the mechanical loads during the operation of the combustion chamber structure.

In principle, however, the jacket 34 can also be embodied in any other desired manner provided that it seals off the coolant channels 38 against one another. For example, the jacket 34 can be formed by a welded-on metal sheet or several welded-on metal sheets, or also by a covering material applied by means of cold gas spraying.

During operation of the combustion chamber structure 10, the coolant is conducted through the coolant channels 38. The reaction heat given off to the liner 12 during combustion in the combustion chamber 14 is transferred to the coolant in the coolant channels 38 and transported away by same. In the exemplary embodiment described here, the described coolant chamber 16 has the function of distributing the coolant to the individual coolant channels 38, and the additional coolant chamber 17 has the function of receiving the coolant from the individual coolant channels 38 and redirecting it to the injection head 62. In principle, however, any coolant chamber 16, 17 can have the function of distributing the coolant to the individual coolant channels 38 or of collecting the heated coolant from the individual coolant channels 38 and discharging or redirecting it.

Unlike known combustion chamber structures, in which a manifold is attached to a galvanically applied jacket by means of welding, in the combustion chamber structure 10 disclosed herein, the distributor and the collector, i.e., the coolant chamber 16 and the additional coolant chamber 17, are formed by the liner 12 itself. Instead of a manifold, only the lower wall 28, a cover, need be mounted, for example. As a result, it is no longer necessary for the jacket 34 to have a corresponding interface structure for the distributor and/or collector. For one, this offers the advantage that, in the disclosed combustion chamber structure 10, the jacket 34 can be applied in a single cycle if the jacket 34 is applied galvanically. This results in shorter bath times during galvanizing, and hence to lower manufacturing costs. For another, the attachment of a simply designed cover represents a simpler process than the welding-on of an annular manifold that is embodied as a half-shell, which also results in a reduction in cost. Moreover, this eliminates the need for the jacket to be made of a weldable material, so that the material of the jacket is subject to fewer restrictions.

Since the cover—the lower wall 28—is also made of steel like the liner 12, the materials to be welded are now steel with steel, and no longer steel (manifold) with nickel (jacket). This facilitates the welding process. What is more, the weld seam can be provided not only by means of electron beam welding (EB welding), but also by means of tungsten inert gas welding (TIG welding), which also results in lower costs.

Finally, in the disclosed combustion chamber structure 10, the load-bearing function is taken over primarily by the liner 12. The way this achieved is that, for one, both the coolant chamber 16 and the additional coolant chamber 17 are formed by the liner 12, which also surrounds the combustion chamber 14. It is therefore not necessary to provide one or more interface geometries on one of the jackets 12, 34 in order to connect the distributor(s) or collector(s), nor is it necessary to connect one or more separate distributors or collectors to a jacket 12, 34 of the combustion chamber structure 10. This results in a high level of stability on the part of the liner 12, since forces acting on the liner 12 can be redirected directly via the liner 12 without having forces flow over a transition such as a weld seam or a galvanic nickel fusion zone, for example. In addition to this, in the exemplary embodiment shown here, the liner 12 is made of a high-strength steel.

Since the load-bearing function is taken over primarily by the liner 12, the jacket 34 can have a thinner design. This results in cost savings due to the material saved, and if the jacket is applied, this means additional cost savings due to the shorter processing and/or bath times.

The coolant chamber 16 and the additional coolant chamber 17 are formed by the liner 12 and are thus located in the immediate vicinity of the combustion chamber 14 and the interior space 20 of the combustion chamber structure 10. As a result, the disclosed combustion chamber structure 10 has a small outside diameter and thus a low mass as well.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A combustion chamber structure for a rocket engine, comprising:
    a liner having an inner surface surrounding a combustion chamber, the liner having an outer surface facing away from the combustion chamber, the liner widening at a longitudinal end of the liner to form a coolant chamber for at least one of collecting or distributing a coolant at the longitudinal end of the liner, the coolant chamber extending in a circumferential direction of the liner, the liner being embodied as a one-piece part, the liner further comprising:
        a plurality of coolant channels extending in a longitudinal direction of the liner and being formed on the outer surface of the liner;
        a widened portion at the longitudinal end having a y-shaped cross-section which forms at least two walls of the coolant chamber in the one-piece part; and
        a connecting structure that fluidly connects the coolant chamber to the plurality of coolant channels, the connecting structure including a plurality of through holes extending in the liner in the longitudinal direction wherein each respective through hole of the plurality of through holes leads from a respective coolant channel of the plurality of coolant channels to the coolant chamber;
        wherein a first wall of the at least two walls forms a longitudinal length of the y-shaped cross-section, the longitudinal length extending to a terminal end of the longitudinal end of the liner, and a second wall of the at least two walls extending in a radial direction away from the combustion chamber beginning at a longitudinal location of the connecting structure, the second wall of the at least two walls forming a radial length of the y-shaped cross-section; and a third wall of the coolant chamber extending from a radial end of the second wall to the terminal end of the longitudinal end.

2. The combustion chamber structure as set forth in claim 1, further comprising a jacket that surrounds the liner, at least partially, such that the coolant channels are covered and fluidly isolated from one another.

3. The combustion chamber structure as set forth in claim 2, wherein at least a portion of the coolant chamber formed by the liner is a region that is not covered by the jacket.

4. The combustion chamber structure as set forth in claim 1, wherein the coolant chamber is delimited by a fourth wall connected in a fluid-tight manner to the liner.

5. The combustion chamber structure as set forth in claim 4, wherein the fourth wall is connected to the liner by means of a welded connection.

6. The combustion chamber structure as set forth in claim 4, wherein the coolant chamber is delimited by a plurality of walls, and wherein the plurality of walls that are not the fourth wall are each formed by the liner.

7. The combustion chamber structure as set forth in claim 4, wherein the coolant chamber is delimited by a plurality of walls, and wherein one of the plurality of walls that is not the fourth wall is formed by a portion of an inner wall of the liner, and wherein the coolant chamber extends radially outward.

8. The combustion chamber structure as set forth in claim 1, wherein the coolant chamber is formed by a groove extending in the liner in the circumferential direction thereof.

9. The combustion chamber structure as set forth in claim 8, further comprising an injection head for introducing a fuel into the combustion chamber, with the coolant chamber being in fluid communication with the injection head.

10. The combustion chamber structure as set forth in claim 1, wherein the liner is embodied such that the liner bears the majority of the forces acting on the combustion chamber structure.

11. The combustion chamber structure as set forth in claim 1, wherein the liner has a first portion that defines the combustion chamber and a second portion adjacent to the first portion that forms at least a portion of an expansion nozzle, and wherein the coolant chamber is formed at the second portion.

12. The combustion chamber structure as set forth in claim 1, wherein the coolant chamber has an attachment flange on an outer peripheral edge.

13. The combustion chamber structure as set forth in claim 12, wherein the attachment flange is configured to attach the combustion chamber structure to an expansion nozzle of a rocket engine.

14. The combustion chamber structure as set forth in claim 12, wherein the attachment flange is integrally formed with the liner.

15. The combustion chamber structure as set forth in claim 14, wherein the attachment flange is formed by removing material of the liner.

16. The combustion chamber structure as set forth in claim 1, wherein the coolant chamber is formed through the removal of material of the liner.

17. The combustion chamber structure as set forth in claim 1, comprising a second coolant chamber formed at an opposing longitudinal end of the liner.

* * * * *